US008060880B2

(12) United States Patent
Cherem et al.

(10) Patent No.: US 8,060,880 B2
(45) Date of Patent: Nov. 15, 2011

(54) SYSTEM USING BACKWARD INTER-PROCEDURAL ANALYSIS FOR DETERMINING ALTERNATIVE COARSER GRAINED LOCK WHEN FINER GRAINED LOCKS EXCEEDING THRESHOLD

(75) Inventors: Sigmund Isy Cherem, Ithaca, NY (US); Trishul Amit Madhukar Chilimbi, Seattle, WA (US); Sumit Gulwani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 970 days.

(21) Appl. No.: 11/744,642

(22) Filed: May 4, 2007

(65) Prior Publication Data

US 2008/0276025 A1 Nov. 6, 2008

(51) Int. Cl.
*G06F 12/14* (2006.01)
*G06F 9/46* (2006.01)
*G06F 12/00* (2006.01)
*G06F 17/50* (2006.01)

(52) U.S. Cl. ........... 718/102; 718/100; 710/20; 710/200

(58) Field of Classification Search .................. 718/102, 718/100; 710/200, 20
See application file for complete search history.

(56) References Cited

U.S. PATENT DOCUMENTS

| | | | |
|---|---|---|---|
| 4,716,528 A * | 12/1987 | Crus et al. ..................... 710/200 |
| 5,414,839 A * | 5/1995 | Joshi ..................................... 1/1 |
| 5,442,763 A * | 8/1995 | Bartfai et al. ................. 711/145 |
| 5,737,611 A * | 4/1998 | Vicik ............................ 710/200 |
| 6,047,358 A | 4/2000 | Jacobs |
| 6,144,983 A | 11/2000 | Klots et al. |
| 6,304,924 B1 | 10/2001 | Varma |
| 6,314,563 B1 | 11/2001 | Agesen et al. |
| 6,418,438 B1 * | 7/2002 | Campbell ............................ 1/1 |
| 6,662,364 B1 | 12/2003 | Burrows et al. |
| 6,795,901 B1 | 9/2004 | Florek et al. |
| 6,910,039 B2 | 6/2005 | Daynes |
| 6,950,945 B2 | 9/2005 | Pfister et al. |
| 6,963,872 B2 * | 11/2005 | Whang et al. ................. 710/200 |
| 2005/0010729 A1 | 1/2005 | Silvera et al. |
| 2005/0086031 A1 * | 4/2005 | Yoshida et al. .................... 703/1 |
| 2007/0101327 A1 * | 5/2007 | Burdick et al. ............... 718/100 |

OTHER PUBLICATIONS

Michael Hicks, Jeffrey S. Foster, Polyvios Pratikakis; Lock Inference for Atomic Sections; Apr. 14, 2006, in First ACM SIGPLAN Workshop on Languages, Compilers, and Hardware Support for Transactional Computing (TRANSACT), pp. 1-6.*
Michael Emmi, Jeffrey S. Fischer, Ranjit Jhala, Rupak Majumdar; Lock Allocation; POPL'07, Jan. 17-19, 2007 ACM.*

(Continued)

*Primary Examiner* — Meng An
*Assistant Examiner* — Abu Ghaffari
(74) *Attorney, Agent, or Firm* — Workman Nydegger

(57) ABSTRACT

Locks which protect data structures used within atomic sections of concurrent programs are inferred from atomic sections and acquired in a manner to avoid deadlock. Locks may be inferred by expression correspondence using a backward inter-procedural analysis of an atomic section. Locks may be sorted according to a total order and acquired early in an atomic section to prevent deadlock. Multiple granularity of locks are determined and employed. Fine grained locks may be inferred and acquired to reduce contention. Coarse grained locks may be determined and substituted for fine grained locks when necessary for unbounded locations or to reduce the number of finer grained locks.

11 Claims, 5 Drawing Sheets

OTHER PUBLICATIONS

"Autolocker: Synchronization Inference for Atomic Sections," by Bill McCloskey, Feng Zhou, David Gay and Eric Brewer, UC Berkeley, Intel Research, Copyright 2006 ACM, [online] [retrieved on Nov. 27, 2006], 13 pgs. Retrieved from the Internet: http://berkeley.intel-research.net/dgay/pubs/06-popl-autolocker.pdf.

"First Year Report—Path Inference for Atomic Sections," by Dave Cunningham, date unknown, [online] [retrieved on Nov. 27, 2006], 25 pgs. Retrieved from the Internet: http://www.doc.ic.ac.uk/~dc04/1st_year_report.pdf.

"Lock Allocation," by Michael Emmi, Jeffrey S. Fischer, Ranjit Jhala and Rupak Majumdar, UC Los Angeles, UC San Diego, Copyright 2007 ACM, [online] [retrieved on Nov. 27, 2006], 6 pgs. Retrieved from the Internet: www.cs.ucla.edu/~fischer/papers/popl07_locking.ps.

"Lock Inference for Systems Software," by John Regehr and Alastair Reid, School of Computing, University of Utah, date unknown, [online] [retrieved on Nov. 27, 2006], 6 pgs. Retrieved from the Internet: http://www.cs.utah.edu/flux/papers/tsl-acp4is.pdf.

* cited by examiner

SYSTEM USING BACKWARD INTER-PROCEDURAL ANALYSIS FOR DETERMINING ALTERNATIVE COARSER GRAINED LOCK WHEN FINER GRAINED LOCKS EXCEEDING THRESHOLD

BACKGROUND

Computer programs and software are ubiquitous and are used not just to direct the functionality of conventional computers but also to control and enhance the functionality of myriad modern products and appliances. For instance, televisions, household appliances, cellular phones, automobiles, medical devices, and so forth, may incorporate computer programs which direct and enhance their functionality.

Increasingly, computers and computer processors are no longer simple single processors executing software in an instruction-by-instruction sequential fashion. The availability of multi-core processors and multiple-processor computing systems is increasing and the demand for concurrent (or parallel) software to take advantage of multi-processor computers and processors is also increasing. Computers and processors are increasingly multiple processors which can concurrently, or in parallel, execute multiple instructions and procedure threads simultaneously. Such concurrent processing (also referred to as "parallelism") can greatly increase both the speed and processing power of computer systems when correctly exploited.

This increasing availability of multi-core and parallel computer processors is rapidly increasing the availability of parallelism in computing hardware and is greatly increasing the demand on developers to develop and redesign software to exploit the available parallelism. The use of parallelism and concurrency in programming is becoming increasingly more useful, important, and ubiquitous. However, in order to fully exploit the available parallelism, concurrent programs are typically fashioned, implemented, and executed in a way that protects data that might be accessed or modified by multiple concurrent threads of a concurrent process. Synchronization between different threads that may execute simultaneously in a concurrent program is an important component of developing and deploying correct concurrent software.

Software developers have used explicit lock-based synchronization to protect shared data during concurrent processing. However, explicit lock-based synchronization, specified by the software developer, may not be modular, may be error prone, and may not be easily maintained, extended, or modified.

Another solution to the synchronization problem is transactional memory where concurrent threads execute optimistically, assuming a conflict will not occur. In transactional memory, when a conflict does occur, conflicts may be detected after the fact and execution is then rolled back and repeated to alleviate the conflict. In cases of high contention, those cases where multiple conflicting concurrent threads are highly likely to run simultaneously, transactional memory can be very inefficient. Additionally, implementation of transactional memory often requires special hardware support. Transactional memory has also been implemented using software (i.e., software transactional memory). However, software transactional memory has other limitations, too. It is not well suited when programs have externally visible effects (for example if the program shows a message on a screen or writes a file to a disk), these actions are hard to—and sometimes cannot be—rolled back.

Better and more easily written concurrent programs would help to enable the exploitation of multi-core processors and parallel computing systems. Either locks or transactional memory may be employed for protection of shared data which may possibly be utilized by multiple threads during execution of concurrent threads in a concurrent process. Transactional memory will continue to be problematic in systems having high contention. Manually determining and hand coding locks can be both very tedious and time consuming for a software developer and can be prone to error. Further, it may be difficult for a software developer to know or keep track of each piece of data that is shared by multiple threads in a concurrent program or may become shared during subsequent modification or enhancement of the software. Consequently, manually determined locks are not easily extensible when concurrent software is modified or updated and may continue to be a significant source of error.

Using locks that are inferred at execution time may also prove problematic. Locks that are inferred at execution time may cause deadlocks or other bad behavior. Using locks of fine granularity may reduce contention, allowing more exploitation of parallelism, but fine grained locks may also be more difficult to determine and more prone to deadlock. Coarser grained locks might be easier to determine and may be less prone to deadlock but may also be likely to lead to higher contention, causing less exploitation of parallelism and less efficient runtime behavior of concurrent systems.

BRIEF SUMMARY

Embodiments described herein relate to determining and acquiring locks for concurrent programs. For example, embodiments described herein provide for acquiring locks within a concurrent program by identifying atomic sections of a concurrent program and determining one or more locks that are to be acquired when executing the atomic section. In certain embodiments, a compiler will determine the locks for an atomic section during a compile cycle. Embodiments may acquire one or more locks for an atomic section prior to executing an instruction within the atomic section which uses a resource subject to the one or more locks determined for the atomic section.

Embodiments can also prevent deadlock during execution of concurrent programs by acquiring locks determined for an atomic section of a concurrent program early within an atomic section and or/in an order sorted according to an appropriate total order. In certain embodiments, code expressing the locks to be acquired may be added (e.g., at compile time) to the appropriate location within the code of the program. In certain embodiments, locks may be acquired at runtime by a runtime library.

Additional embodiments described herein relate to determining locks to be acquired for a concurrent program. Locks may be determined by identifying an atomic section of a concurrent program and determining an expression correspondence for the atomic section. One or more locks may be determined for the atomic section from the expression correspondence for the atomic section by using a backward inter-procedural analysis.

Still other embodiments described herein relate to determining fine and coarse grained locks for a concurrent program. An atomic section may be identified for an atomic section of a concurrent program and one or more fine grained locks may be determined for the atomic section. If the fine grained locks for the atomic section exceed a particular bound, the alternative locks may be determined so that all the previously determined fine grained locks are covered by the alternative locks and the alternative locks do not exceed the particular bound.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments described herein relate to determining and allocating locks for concurrent programs. The embodiments of the present invention may comprise a special purpose or general-purpose computer including various computer hardware, as discussed in greater detail below.

Figure 1:
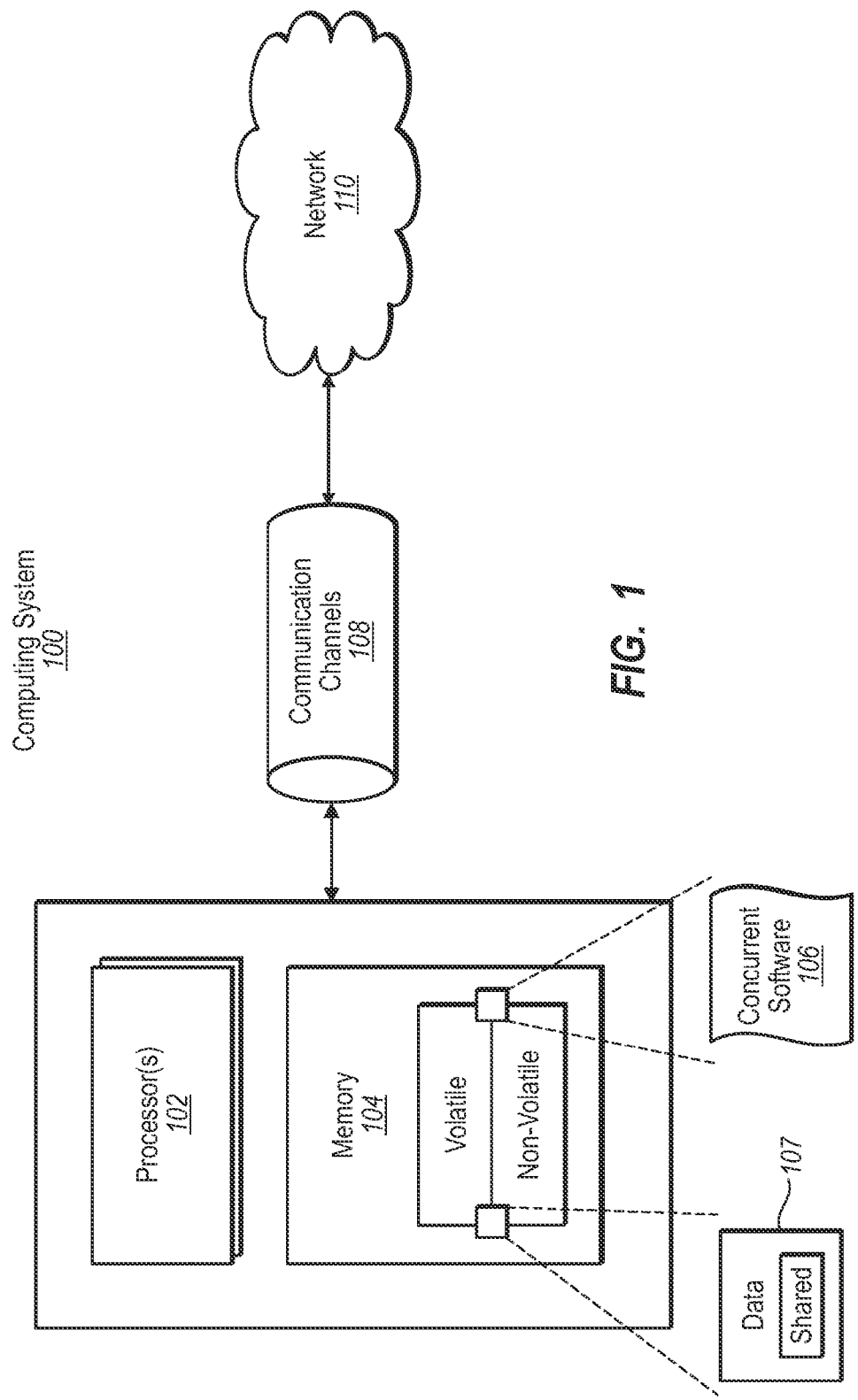
FIG. 1 illustrates a computing system in which embodiments described herein may operate.

FIG. 1 shows a schematic diagram of an example computing system 100 that may be used to implement embodiments of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments consistent with the principles described herein also include computer-readable media for carrying or having computer-executable instructions or data structures stored thereon. Such computer-readable media can be any available media that can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices. Physical computer-readable media, however, does not include signals. The computer-readable media may also be any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium.

Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Concurrent programs are those programs that may have multiple threads which may execute simultaneously on one or more computer processors. Each thread of a concurrent program may access, utilize, and possibly modify any number of variables, fields, and data structures. It is often the case that some or many of the variables, fields, and data structures that are being utilized and modified by a thread of a concurrent program will also be accessed, utilized, and possibly modified by another thread of a concurrent program. Such attempted simultaneously accessed or modified data within concurrent programs may lead to errors or contention within a concurrent program.

Consider, for example, a large bank with multiple branches. If two branches of a bank were attempting to update the account balance in a particular savings account simultaneously, then the resulting balance may be in error. If Branch One and Branch Two both read the original balance at the same time, then both branches would have the same starting balance for their calculations. However, if Branch One calculated and updated the account balance but then Branch Two immediately overwrote the balance information with a different balance that Branch One calculated, then the resulting account balance would be incorrect. The account balance after the two transactions would reflect only the transaction that transpired at Branch Two and the transaction which occurred at Branch One would be lost. Concurrent software suffers much the same problem as that which might be experience by the competing branches of the bank. (Indeed, the two transactions at Branch One and Branch Two may themselves be simultaneous threads within a concurrent program or system.)

Embodiments described herein relate to determining locks for concurrent software. Such locks may serve to help alleviate the problem precipitated by multiple threads of a concurrent program accessing, utilizing, and/or modifying shared data simultaneously (or nearly simultaneously). Other embodiments described herein relate to acquiring locks determined for a concurrent program during the execution of the program.

Figure 2:
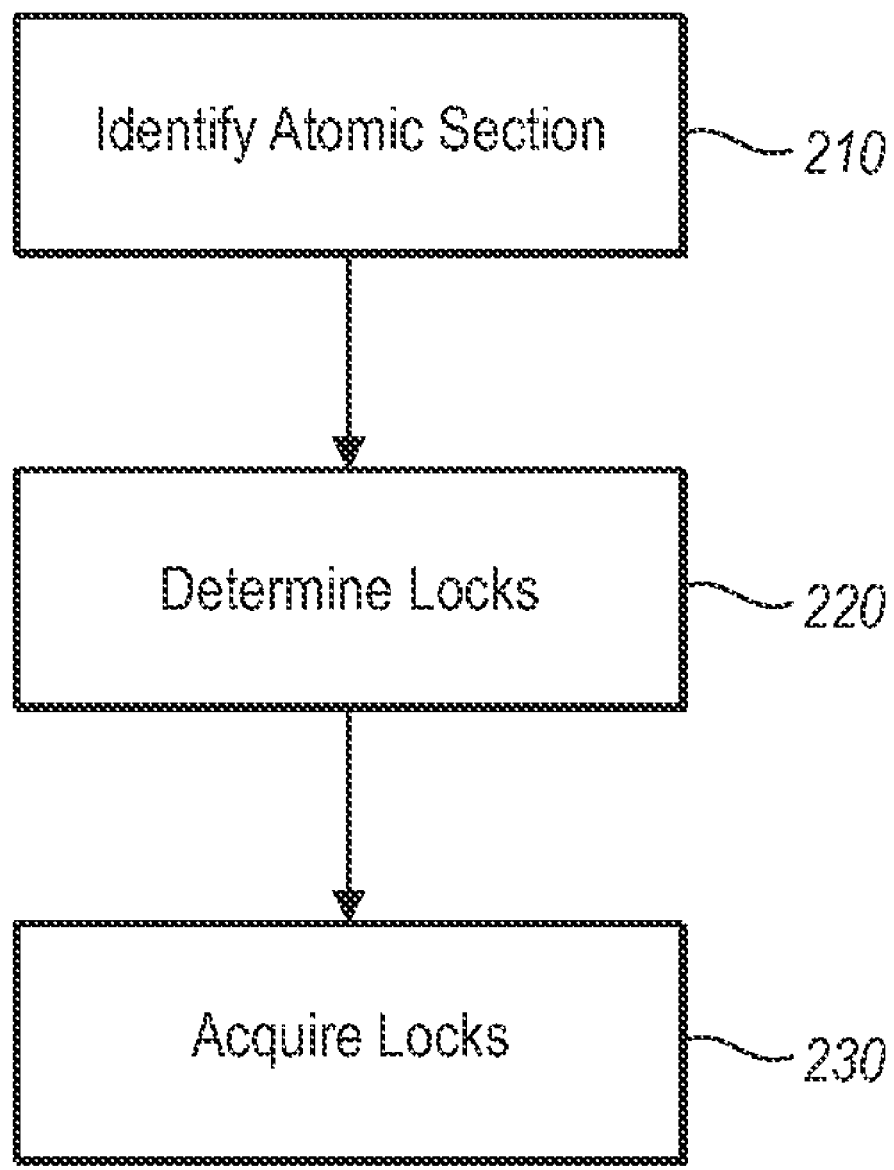
FIG. 2 illustrates a method of determining and acquiring locks for an atomic section of a concurrent program.

FIG. 2 depicts a flowchart of a method 200 of acquiring locks within a concurrent program. Such a method may be implemented within the computing system as illustrated by FIG. 1. However, although the method 200 may be implemented on a computing system, it should not be considered to be limited and may extend to implementations on any other suitable platform. The method 200 includes an act 210 of identifying an atomic section within the concurrent program. Further, when implemented within computing system 100, embodiments described herein may include software 106 executing on the computing system and may relate to data 107 which may be shared data within a concurrent program, global data, or may be local data instantiated for a single particular process.

An atomic section is a section of code or a sequence of instructions whose execution should be atomic with respect to other atomic sections of the concurrent program. If a section of code is atomic, then it should appear (although not necessarily be the case) as if the atomic section executed sequentially with respect to all other threads of the program. In other words, if a section is atomic, no interaction or interleaving between that particular atomic section and other atomic sections, threads, or processes within the concurrent program will change the observable behavior or outcome of the program.

For example, an atomic section of the concurrent program may be identified by observing a manual annotation placed by a programmer during coding indicating that a particular code section should be considered atomic. Such an annotation, indicated by the tag primitive "atomic," is illustrated in Listing 1.

Listing 1

```
function foo (x, y, z) {
    instruction one;
    instruction two;
    ...
    atomic {
        x = y;
        z = 100;
        ...
    }
}
```

Manual annotations by a software developer of which sections of code in a concurrent program should be considered atomic may be advantageous in certain embodiments. Although manual determination of which code sections may be treated as atomic and annotations of atomic sections by programmers during coding can suffice and be advantageous in certain embodiments, such manual annotation should not be considered limiting. An atomic section may also be inferred by an automated process before, during, or after the compilation of a concurrent program. Atomic sections may be determined or specified by other processes, both manual or automatic and may be implemented within a computer process. In embodiments consistent with the principles herein, the indication of an atomic section may be done at any suitable time by any suitable method or process.

The act 210 of identifying an atomic section may be by observing or accessing a corresponding annotation placed by the programmer during coding. Of course, identifying an atomic section may also be by observing or accessing a corresponding indication which has been provided or created by another suitable process, either manual or automatic. The act 210 of identifying the atomic section may be by identifying accesses to a data-structure that should happen atomically. The act 210 of identifying the atomic section may be by any suitable method or process, accessing or observing any suitable indication or data structure, which indicates that a particular code section within a concurrent program should be considered to be atomic.

Once an atomic section has been identified, the method 200 proceeds to an act 220 of determining one or more locks to be acquired when executing the atomic section. The one or more locks which are determined may represent a memory location, data, variables, data structures, lists, and/or arrays, and so on which it might be advantageous to protect during the execution of the atomic section. Locks may be determined so that, after the determined locks have been acquired for a particular atomic section, no other thread or atomic section within the concurrent program may access, utilize, and/or modify the memory location, variables, data structures, lists, arrays, and so on, until after the lock acquired during the execution of the atomic section has been released.

In certain embodiments, the locks determined for an atomic section may differ in type depending on whether a memory location, variable, data structure, list, array, and so on, is to be only accessed or is possibly to be written or otherwise modified. It may be appreciated that a lock allowing read-only access to a memory location might be shared in certain embodiments so that other processes may read (but not modify) the memory location. In such an embodiment, a different type of lock may be provided for modify (or write) access to a memory location so that one and only one atomic section may modify a memory location at any given time. Such multiple and differing types of locks are consistent with embodiments as described herein and should be considered to be included in the determination of locks for an atomic section of a concurrent program.

Although the determination of locks for an atomic section may be performed manually by a programmer or analyst, it is advantageous in particular embodiments to perform the act automatically within a computing system.

Locks may be determined for an atomic section by analyzing the shared memory locations that may be accessed, utilized, and/or modified as expressed in terms of expressions valid at the entry of the atomic block. In certain embodiments, this may be done by performing a backward inter-procedural analysis for the atomic section. Such a backward inter-procedural analysis would commence with the last statement within an atomic section and proceed, statement by statement or instruction by instruction, until the beginning of the atomic section is reached. Consider the code example in Listing 1.1.

Listing 1.1

```
atomic {
    int* d = x;
    *d = 3;
}
```

In Listing 1.1, it may be desired to protect the shared memory location d. It may be inferred that locking (&(*x)) would protect d by analyzing the code section in a backward fashion in order to determine that acquiring a lock on (&(*x)) suffices to protect d. Such backward analysis may be used to determine the locks required for each shared memory location within an atomic section of a concurrent program.

Now consider the code example given in Listing 1.2.

Listing 1.2

```
int*** x, y;
int** p;
...
if ( ... ) {
    x = y;
}
atomic {
    *x = p;
    int** w = *y;
    int* z = *w;
    *z = 3;
}
```

In this analysis, the backward inter-procedural analysis begins by looking at the last statement, *z=3. It may be inferred from this statement that the memory location corresponding to (&(*z)) (immediately before the last statement) needs to be locked at the beginning of the atomic section. (Or, at least, before any instruction affecting the shared memory locations is executed within the atomic section.) Now, moving upwards in the backward analysis, the statement int*z=*w is analyzed. Because z is given in terms of w, it may now be inferred that a sufficient lock required would be one that guards the memory location corresponding to (&(**w)) (immediately before the statement int*z=*w). This, of course, would still give the desired protection of the shared memory location.

Now, continuing in the backward analysis of the code section of Listing 1.2, it is seen that w is given in terms of y. From that expression in the code section, it may now be inferred that a lock that guards the memory location corresponding to (&(*y)) (immediately before the statement intw=*y) would be sufficient to protect the shared memory location. The protection of (&(***y), as determined from the expression correspondence in the backward inter-procedural analysis of the code section, is sufficient to protect the (potentially) shared memory locations indicated by each of z, w, and y.

The backwards inter-procedural analysis is not yet complete, however. The statement (*x=p;) is now analyzed. From this statement it is inferred that the memory location corresponding to (&(p) should also be protected by a lock (since x may be aliased with y). Thus, all statements within the atomic section have now been analyzed via the backward inter-procedural analysis. From this analysis, it has been determined that acquiring the locks on (&(p), (&(*y) is sufficient to protect the shared memory locations accessed, utilized, or modified within the atomic section of Listing 1.2. This analysis may be performed by a compiler or other suitable automated process. In certain embodiments, such analysis may generate a statement such as {acquire (&(p), (&(***y))} which could then be appropriately inserted into the atomic code section and executed by a run-time library during execution of the concurrent program in order to acquire the appropriate locks. Such insertion of the appropriate acquire statement is illustrated in Listing 1.2.1.

Listing 1.2.1

```
atomic {
    acquire ( &(**p), (&(***y));
        // acquires appropriate locks
    *x = p;
    int** w = *y;
    int* z = *w;
    *z = 3;
    release( );
        // releases locks acquired for this section
}
```

In order to have an efficient and not excessive list of locks which are to be acquired for an atomic section, particular embodiments will ensure that the locks which are determined for an atomic section are disjoint. This is easily illustrated in terms of a linked list or an array. For an array, within a particular atomic section, it may be determined to acquire a lock on only one particular element of the array. However, in another atomic section it may be determined that every element of the array (or a large number of elements of the array) needs to be protected. If all elements of an array need to be protected, it may be more efficient to acquire a single lock on the array, itself, rather than individual discrete locks on each and every element of the array. In still other atomic sections, at one point in the analysis it may appear that a lock on one element of the array is necessary but, later in the analysis, it may appear that a lock on the entire array is necessary.

Embodiments consistent with the principles described herein may ensure that all the locks determined for an atomic section are disjoint. That is, if it is determined that a lock on an array and a lock on a particular array element are determined to be desired, then the determination of the locks may include the lock on the array and discard the lock on the array element (which the determination knows is included and thereby protected by the parent lock). This is safe because the array element is protected whenever the entire array is protected. In particular embodiments, the determination of locks includes determining if any locks are included in other locks determined and a disjoint set of locks is produced by removing the locks which are included in other locks from the list of locks to be acquired.

Further, the determination of the locks for an atomic section may take into account particular bounds for the number of locks to be acquired for an atomic section. In the array example discussed above, a lock for the entire array may be substituted for a lock on all the elements of the array. In certain embodiments, however, a lock on an entire array may be substituted for a lock on a large number of discrete elements of the array. The particular size or extent of the "large number" should not be considered to be limiting. The bound, above which a "parent" lock is substituted for discrete individual locks, may be set manually by a programmer, by a system administrator, or may be determined by an automated process within a computing system.

In one particular embodiment, a fictitious lock (i.e., an alias) may be substituted for a large number of discrete locks. In this fashion, one lock may serve to lock and provide protection for n discrete elements of an M>n element array A and another lock may serve to lock and provide protection for j elements of the M>j element array A where each of the n discrete elements is different from each of the j elements of the array. Again, as can be appreciated from a review of the information provided herein, the extent or magnitude of "large" should not be considered limiting and may be of different magnitudes in different embodiments or applications of the principles described herein.

It may also be appreciated that such substitution of a parent lock for discrete locks may also be advantageous in the case of unbounded structures. For example, each element of a linked list of unknown size may be locked by such a parent lock. Consider the code example in Listing 1.3.

Listing 1.3

```
list* reverse (list* x) {
    list* y = NULL;
    atomic {
        while ( x != NULL) {
            list* t = x ->next;
            x->next = y;
            y = x;
            x = t;
        }
    }
}
```

In this code example, the analysis of the atomic section may indicate that a lock is required to be acquired for x. However, further analysis of the while loop in the atomic section determines that a lock should be acquired for x→next, also. It can be appreciated, that continued analysis of the while loop of the atomic section may indicate that an unbounded acquisition of locks would be required—that is, acquired by the pseudo-statement:

acquire(x, x→next, x→next→next, x→next→next→ next, . . . ).

As can be appreciated, this may be impossible to acquire at runtime because the actual extent of the list cannot be known until the actual execution of the atomic section of the concurrent program and so each of the locks indicated in the statement, above, cannot be known when the statement is encountered at runtime.

In a fashion similar to that for arrays, a single lock may be acquired in order to protect each element of a possibly unbounded linked list. In certain embodiments, any such unbounded location may be locked by the acquisition of a single parent lock. In the case of the array, discussed above, there may be a particular location (i.e., the head of the array, itself) which can suffice to indicate the lock required to protect the entire structure. However, in the case of a possibly unbounded linked list—whose elements may be spread randomly throughout a heap (or other data or memory repository)—a particular known memory location may not suffice to indicate the required lock. In such cases, in particular embodiments, the determination of locks may provide an alias or fictitious lock which would then serve to indicate a lock on each and every element of the possibly unbounded linked list. This may be similar to the fictitious locks which were used, above, to indicate large numbers of elements from a particular array (without locking all elements of the array) and allowing another fictitious lock to be used to lock other elements of an array.

After the one or more locks have been determined for the atomic section, the method includes an act 230 of acquiring the one or more locks for the atomic section. In one particular embodiment, the one or more locks which are determined for an atomic section are acquired at the beginning of the atomic section. In another embodiment, each of the one or more locks are acquired within the atomic section prior to the execution of an instruction within the atomic section using a resource subject to any of the one or more locks. In one particular embodiment, the one or more locks determined for an atomic section are acquired by a runtime library during the execution of the concurrent program.

In some embodiments, all the locks which are acquired for an atomic section are acquired based upon some total order. Acquiring locks using a total order is advantageous in order to avoid deadlock between competing threads or atomic sections of a concurrent program. Consider the two functions illustrated in Listing 2.

Listing 2

```
function swap1 (int* x, int* y) {
    atomic {
        int d = *x;
        *x = *y;
        *y = d;
    }
}
```

Listing 2

```
function swap2 (int* x, int* y) {
    atomic {
        int d = *y;
        *y = *x;
        *x = d;
    }
}
```

If x and y in the functions swap1 and swap2 of Listing 2 were shared variables and locks were attempted to be acquired for the atomic sections of swap1 and swap2, it is possible that a deadlock may occur. For example, swap1 may attempt to acquire a lock on x and then acquire a lock on y. If swap2 were simultaneously attempting to acquire a lock on y and then x, it is entirely possible that swap1 would acquire a lock on x and swap2 would acquire a lock on y. However, swap1 could not complete until it acquired a lock on y. That lock on y would not be available to swap1 until swap2 proceeded to completion and then released its locks. In this example, swap1 can never complete because swap2 has already acquired the lock on y so swap1 cannot acquire the lock on y which is necessary for completion. Similarly, swap2 cannot complete because it needs to acquire a lock on x before it can complete and release its lock on y. Of course, swap2 cannot acquire the needed lock on x because swap1 has already acquired a lock on x and is waiting for a lock on y.

The above example is a deadlock situation, where one thread or atomic section is waiting for a lock on a resource held by another thread. The other thread or atomic section, similarly, will never complete or release the lock because it, similarly, is waiting for a lock on a resource concurrently held by the first thread or atomic section. In one particular embodiment, the act 230 of acquiring the one or more locks occurs within the atomic section prior to executing an instruction within the atomic section using a resource subject to the one or more locks. By acquiring each of the one or more locks determined for the atomic section early within the atomic section—i.e., at the beginning of the atomic section or prior to executing any instruction within the atomic section using a resource subject to or associated with the one or more locks—such deadlocks may be avoided.

Figure 3:
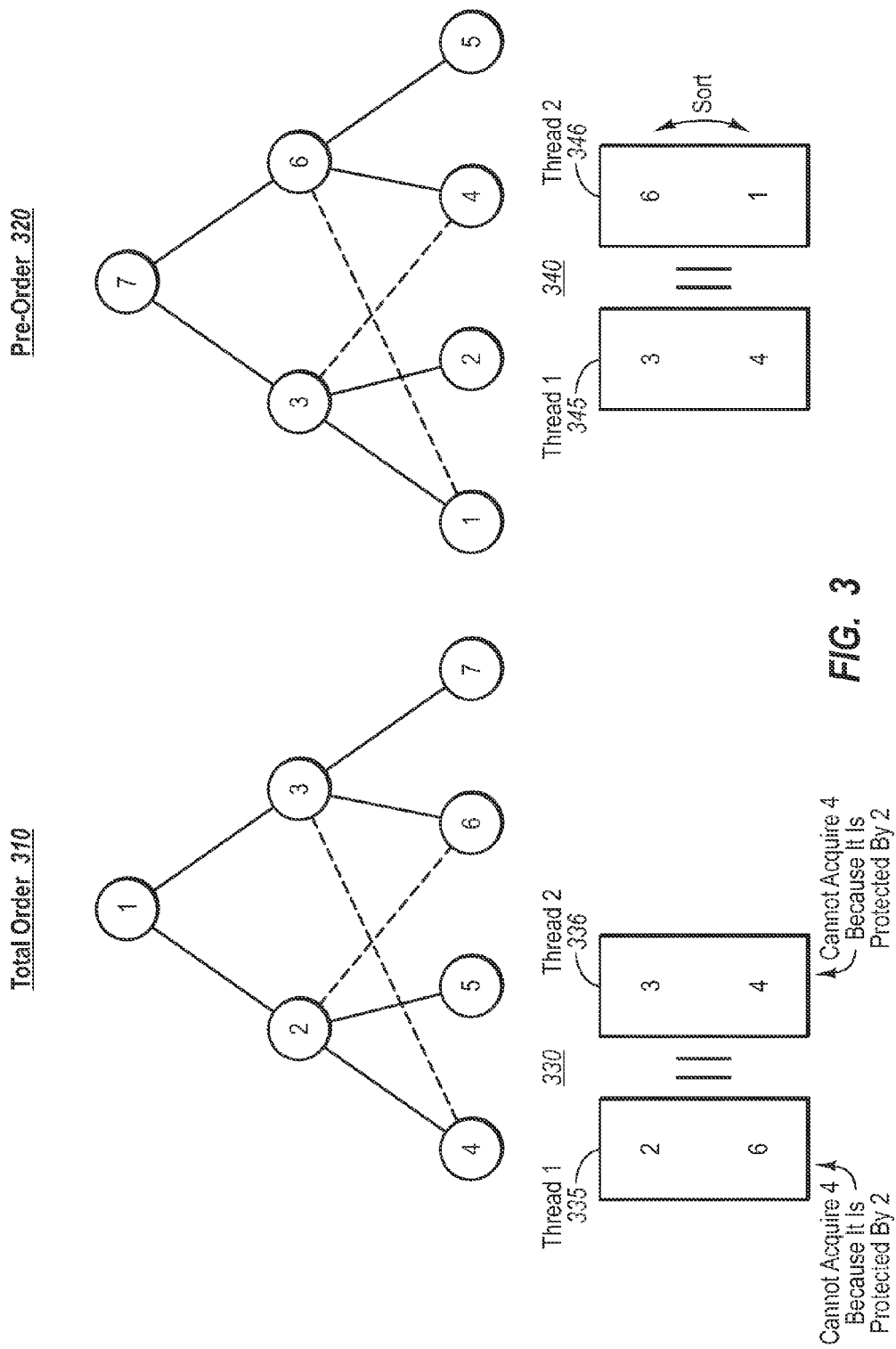
FIG. 3 illustrates examples of total orders including a pre-order which may be used as described herein to avoid deadlock within concurrent programs.

In certain embodiments, locks which have been determined for an atomic section are sorted before they are acquired and then acquired in an appropriate total order in order to further avoid deadlock. FIG. 3 illustrates how an appropriate total order may be utilized to prevent such deadlock.

In FIG. 3, Total Order 310 illustrates a total order for possible locks within a particular concurrent program. The nodes of the order trees, 310 and 320, represent the dependencies in the locks to be acquired for the program. Such dependencies may be, as discussed above, a lock for an array (i.e., parent node) and a lock for an element of an array (i.e., child node). Such trees may also represent the fictitious lock which is determined to represent an entire, possibly unbounded, linked list (i.e., parent node) and the individual elements of the linked list (i.e., child nodes).

In this example, Thread 1 335 requires locks on nodes 2 and nodes 6 before being able to complete execution. However, Thread 2 336 requires locks on nodes 3 and 4 before successful completion of execution. If Thread 1 acquires a lock on node 2, that lock will also protect the child node 4. If Thread 2 acquires a lock on node 3, it will also protect the child node 6. This situation would then lead to a deadlock because Thread 1 is waiting for node 6 (which is protected by a lock on 3 by Thread 2) and Thread 2 is waiting for a lock on node 4 (which is protected by a lock on node 4 by Thread 1).

A different total order, a pre-order, would suffice in certain embodiments to alleviate such a deadlock problem. Pre-Order 320 illustrates such a pre-order. For this pre-order, all nodes are ordered from the left-most lowest order nodes to the right. The resulting pre-order is illustrated by pre-order 320. In this case, thread 1 may acquire a lock on node 3 (which, as illustrated protects node 1). If it has been determined that thread 2 346 requires locks on nodes 6 and 1, then the run-time library sorts the locks to be acquired for that thread (i.e., atomic section) and attempts to acquires the locks on nodes 1 and 6. However, since thread 1 has already acquired the lock on node 3, which protects node 1, a lock cannot be acquired by thread 2 on node 1 and the acquisition of locks by thread 2 is postponed until a lock on node 1 may be available. This will also postpone thread 2's acquisition of a lock on node 6 which then leaves a lock on node 4 available for thread 1 to acquire. Since thread 1 has now been able to acquire all the necessary locks for its atomic section, it may then successfully complete.

After thread 1 has completed, it will then release all the locks it had acquired. Once thread 1 has released its acquired locks, then thread 2 is able to acquire the locks on node 1 and node 6 so that it, too, can execute, complete, and release its acquired locks. Thus, a pre-order can suffice in certain embodiments (whenever the lock dependency graph forms a tree) to prevent deadlocks between atomic sections attempting to acquire locks.

The utilization of a pre-order to prevent deadlock in the acquisition of locks for atomic sections is implemented by determining all the locks required for an atomic section. Once all the locks for an atomic section have been determined, they are sorted by the appropriate total order (i.e., pre-order). Once appropriately sorted, then a run-time library (or other suitable mechanism) may then acquire the determined locks in the sorted order. Utilization of the pre-order and the sorting of the locks to be acquired for an atomic section, particular embodiments provide that all other atomic sections (which are utilizing the same pre-order and sorting mechanism) will appropriately wait for locks and deadlocks will not occur.

While a pre-order suffices to alleviate the deadlock problem, it can also be appreciated that a similar post-order would also suffice to alleviate the deadlock problem (in situations where the lock dependency graph forms a tree). A post-order would be similar to that order illustrated by pre-order 320 illustrated in FIG. 3 but will order the nodes from the right-most least order nodes towards the left (not illustrated). Although it has been demonstrated that not all total orders are sufficient to cure the deadlock problem (i.e., Total Order 310), but it should be considered that any total order, such as the demonstrated pre-order or a post order (e.g., Pre-Order 320), is within the scope of the principles described herein and may be employed within particular embodiments consistent with the principles described herein.

Figure 4:
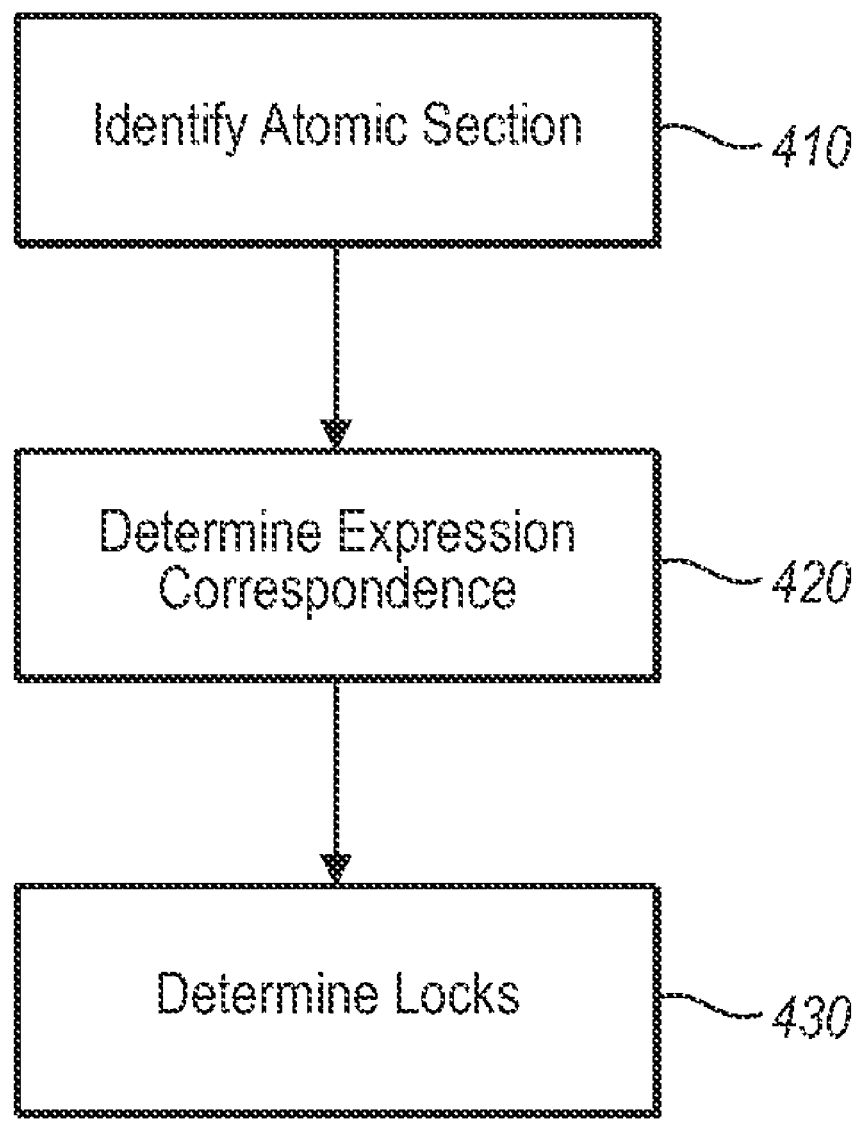
FIG. 4 illustrates the identification of an atomic section of a computer program and the determination of locks for the atomic section using expression correspondence.

FIG. 4 depicts a flowchart of a method 400 of determining one or more locks to be acquired within a concurrent program. Such a method may be implemented within the computing system as illustrated by FIG. 1. However, although the method 400 may be implemented on a computing system, it should not be considered to be limited by that implementation and may extend to embodiments or implementations on any other suitable platform. Further, when implemented within computing system 100, embodiments described herein may include software 106 executing on the computing system and may relate to data 107 which may be shared data within a concurrent program, global data, or may be local data instantiated for a single particular process.

The method 400 also includes an act 410 of identifying an atomic section of the concurrent program. An atomic section is a section of code or a sequence of instructions whose execution should be atomic with respect to other atomic sections of the concurrent program. If a section of code is atomic, then it should appear (although not necessarily be the case) as if the atomic section executed sequentially with respect to all other threads of the program. In other words, if a section is atomic, no interaction or interleaving between that particular atomic section and other atomic sections, threads, or processes within the concurrent program will change the observable behavior or outcome of the program.

As previously described, for example, an atomic section of the concurrent may be identified by observing a manual annotation placed by a programmer during coding indicating that a particular code section should be considered atomic.

Manual annotations by a programmer of which sections of code in a concurrent program should be considered atomic may be advantageous in certain embodiments. Although manual determination of which code sections should be treated as atomic and annotations of atomic sections by programmers during coding can suffice and be advantageous in certain embodiments, such manual annotation should not be considered limiting. An atomic section may also be inferred by an automated process before, during, or after the compilation of a concurrent program. Atomic sections may be determined or specified by other processes, both manual or automatic and may be implemented within a computer process. In embodiments consistent with the principles herein, the indication of an atomic section may be done at any suitable time by any suitable method or process.

The act 410 of identifying an atomic section may be by observing or accessing a corresponding annotation placed by the programmer during coding. Of course, identifying an atomic section may also be by observing or accessing a corresponding indication which has been provided or created by another suitable process, either manual or automatic. The act 410 of identifying the atomic section may be by identifying accesses to a data-structure that should happen atomically. The act 410 of identifying the atomic section may be by any suitable method or process, accessing or observing any suitable indication or data structure, which indicates that a particular code section within a concurrent program should be considered to be atomic.

The method 400 includes an act 420 of determining expression correspondence for the atomic section. Such determination of expression correspondence may, in particular embodiments, be implemented within a backward inter-procedural analysis as described above. Determination of expression correspondence includes an analysis of each statement within an atomic section to determine which memory locations correspond to each statement and which expressions correspond to each (possibly) shared memory location for which a lock may be inferred. As described above, the determination of expression correspondence may include a bottom-up inference of which memory locations need to be locked in order to be protected.

At each program point, a set of expressions are determined that indicate the locks that are desirable to protect the memory locations associated with that particular program point. In a particular embodiment, the programming code (or statements) within an atomic section are analyzed in a backward inter-procedural dataflow analysis to determine the expressions that correspond to the memory locations for which locks are desired. Such a backward analysis inspects and analyzes each statement or instruction within an atomic section in a bottom-up fashion in order to determine which memory locations correspond to each statement and which expressions may correspond to each location desired to be locked.

The backward inter-procedural dataflow analysis determines an expression correspondence which can, in certain embodiments, specify a fine grained set of locks. A fine-grained set of locks would correspond to a lock for each (or most) of the discrete memory locations accessed, utilized, and/or modified within the atomic section. As can be appreciated, such a fine grained set of locks may be advantageous to reduce contention within the concurrent program by allowing other atomic sections to proceed without waiting for coarser grained locks to be released by competing atomic sections or threads.

However, a fine grained set of locks, as determined by the backward inter-procedural dataflow analysis and expression correspondence may come with a performance cost which relates to time or resources necessary to acquire a large number of locks or the time or resources necessary to maintain a large list of discrete locks. In particular embodiments, during the backward inter-procedural analysis, if a set of associated discrete locks exceeds some bound K, then a coarser grained lock may be substituted for the discrete locks within the set of determined locks. As discussed above, the coarser grained locks may be determined by a points-to analysis (as in the case of the array) or may be a fictitious lock determined and maintained to represent an associated set of finer grained discrete locks.

As discussed above, it may be advantageous to determine locks not necessarily for discrete memory locations associated with an atomic section. In the case of the array, as discussed above, a points-to analysis may be utilized to determine a coarser grained set of locks which will result in a set of locks including locks which protect a multiplicity of memory locations associated with the atomic section.

The method 400 also includes an act 430 of determining a set of one or more locks to be acquired for the atomic section from the expression correspondence. As discussed above, particular embodiments may determine a discrete lock for each memory location associated with an atomic section. The locks determined for the atomics section may, in other embodiments, be bounded by some particular limit.

The set of one or more locks which are determined for an atomic section may be sorted and ordered, as discussed above, according to some appropriate total order. Such a total order may be a pre-order or a post-order or any other appropriate order such that, if the locks are acquired at the beginning of an atomic section (or within the atomic section before any instruction subject to any of the locks within the determined set of locks) the order of the locks serves to avoid deadlock.

As discussed above, within particular embodiments, the set of locks which are determined for an atomic section are disjoint. In other words, no lock within the set of determined locks would be subject to or protected by another lock within the determined set. If a lock within the determined set of locks would be protected by another lock in the set, then the finer grained lock may be removed from the set.

Figure 5:
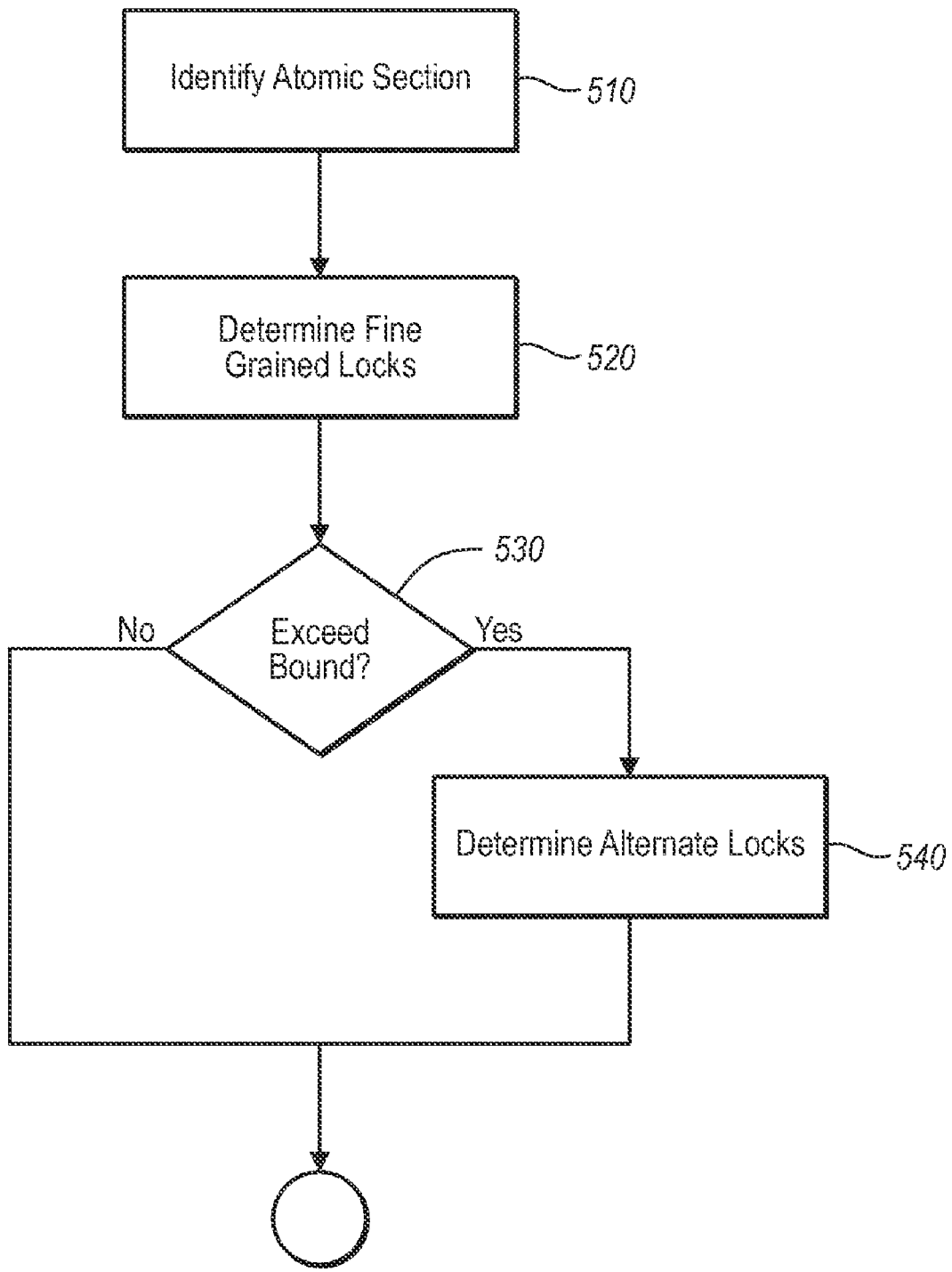
FIG. 5 illustrates determining locks for a concurrent program by identifying an atomic section, determining fine grained locks, determining if the fine grained locks exceed a particular bound, and determining alternative locks to substitute for some subset of the determined fine grained locks.

FIG. 5 depicts a flowchart of a method 500 of determining one or more locks to be acquired for an atomic section within a concurrent program. Such a method may be implemented within the computing system as illustrated by FIG. 1. However, although the method 500 may be implemented on a computing system, it should not be considered to be limited by that implementation and may extend to embodiments or implementations on any other suitable platform. The method 500 may also be implemented as a computer program product comprising one or more computer-readable media upon which are encoded instructions which, when executed on suitable computing equipment, execute the method 500 of determining one or more locks to be acquired for an atomic section within a concurrent program.

The method 500 includes an act 510 of identifying an atomic section of the concurrent program. As above, the act 510 of identifying an atomic section may be by observing or accessing a corresponding annotation placed by the programmer during coding. Of course, identifying an atomic section may also be by observing or accessing a corresponding indication which has been provided or created by another suitable process, either manual or automatic. The act 510 of identifying the atomic section may be by identifying accesses to a data-structure that should happen atomically. The act 510 of identifying the atomic section may be by any suitable method or process, accessing or observing any suitable indication or data structure, which indicates that a particular code section within a concurrent program should be considered to be atomic.

The method 500 includes an act 520 of determining one or more fine grained locks for the atomic section. In certain embodiments, the act 520 of determining one or more fine grained locks for the atomic section proceeds through a backward inter-procedural data analysis. Such back backward inter-procedural dataflow analysis, in particular embodiments, would employ expression correspondence to determine a fine grained set of locks which, when appropriately acquired, would serve to protect each discrete memory location accessed, utilized, and/or modified within the atomic section.

The method 500 also includes an act 530 of determining if the number of the fine grained locks determined for the atomic section exceed a certain particular bound. As discussed above, the exact extent or magnitude of the bound should not be considered limiting as any particular bound—as determined manually, arbitrarily set, or automatically derived—is consistent with the principles disclosed herein.

The method 500 includes an act 540 of determining alternative locks such that all previously determined fine grained locks are covered and the locks do not exceed the particular bound. As illustrated in FIG. 5, the act 540 of determining alternative locks may not necessarily be performed every time the method 500 is performed. Method 500 includes an act 530 of determining if the set of the locks determined for the atomic section exceed some bound. If the set of locks exceeds the bound, then the method proceeds to the act 540 of determining alternative locks such that the locks would not exceed the particular bound.

As discussed above, the particular bound should not be considered limiting. Any bound of any extent or magnitude, whether determined by an automated process or arbitrarily or manually set would be consistent with the principles as described herein.

The alternative locks which are determined in act 540 may, in particular embodiments, come from points-to analysis. Such an analysis can be used to determine a parent lock such that a single lock can serve to lock all the elements on an array. Such an analysis may also serve to determine a single lock which may serve to lock all the elements of a linked list. Such a points-to analysis may also serve to lock and protect another suitable group of finer grained or discrete locks.

The alternative locks are not, however, limited to those which may be determined by a points-to analysis. In particular embodiments, the alternative locks may be fictitious locks (i.e., aliases) which may serve to lock a particular set of discrete locks. For example, such a fictitious lock may be based on type information already present in the source code of the concurrent program and may be used to lock a possibly unbounded linked list or some other data structure which may not be completely knowable at compile time or during runtime before the particular atomic section has run.

In various embodiments, the locks determined for an atomic section may include a number of fine grained locks and a number of alternative coarser grained locks which were determined after a bound were reached for some subset of the finer grained locks. In other embodiments, all locks determined for an atomic section may be fine grained locks. In still other embodiments, all fine grained locks may have been supplanted by one or more alternative coarser grained alternative locks. It should be appreciated from review of the present disclosure that no particular distribution of fine grained or alternative coarser grained locks is necessary to be consistent with the principles disclosed herein.

In various embodiments, the alternative coarser grained locks may be represented by group level locks. A group level lock is a single lock (i.e., a parent lock) which represents a plurality of locks (i.e., child locks). Such group level locks may be graphically depicted by the Total Order 310 and Pre-Order 320 trees of FIG. 3. In the Pre-Order 320 tree of FIG. 3, node 3 may be considered a group level lock and nodes 1 and 2 may be considered child locks. Such child locks may be location level locks which have an actual address within a computing systems memory space or they, themselves, may also be group level locks which, like node 3, have additional child locks.

Group level locks may be actual locations, as the head of an array, or they may be represented by fictitious locks which are maintained during runtime to represent some (possibly unbounded) set of child locks. When a group level lock is maintained as a fictitious lock, it may be maintained and serviced in any appropriate data structure by the runtime process which services and maintains the locking system. The exact nature of the system used to maintain the locks, both location level locks, and coarser grained or group level locks, should not be considered limiting to the principles herein and any suitable system should be considered to be consistent.

As previously discussed, in particular embodiments, both the fine grained locks and the alternative coarser grained alternative locks may be sorted and/or acquired according to an appropriate total order. Such an appropriate total order may be a pre-order or a post-order or any other suitable total order useful to avoid deadlock during the acquisition of the locks or the execution of an atomic section. In one particular embodiment, the locks are determined such that they can be acquired during runtime at the entrance (i.e., the beginning) of the atomic section. In another embodiment, the locks are determined such that they can be acquired at some time within the atomic section prior to the execution of any instruction within the atomic section associated with a protected data structure to be protected by any lock in the one or more locks determined.

The principles described herein may be embodied in other specific forms without departing from the spirit or essential characteristics. The described embodiments are to be considered in all respects only as illustrative and not restrictive. The scope of the embodiments described herein are, therefore, indicated by the appended claims rather than by the foregoing description. All changes which come within the meaning and range of equivalency of the claims are to be embraced within their scope.

What is claimed is:

1. A computer-implemented method of acquiring one or more locks within a concurrent program, the method comprising:
   identifying an atomic section within the concurrent program, the atomic section including a plurality of statements that reference a plurality of variables used within the atomic section, wherein each variable refers to a memory location;
   performing a backwards inter-procedural analysis on the atomic section to determine which of the memory locations need to be locked during execution of the atomic section, the backwards inter-procedural analysis comprising examining lines of code within the atomic section in a bottom to top order, the backward inter-procedural analysis including determining that a memory location is referred to by more than one of the plurality of variables, and placing a fine grained lock on only one of the more than one variables which refer to the memory location;
   after performing the backwards inter-procedural analysis, determining a number of fine grained locks which were placed on the variables of the atomic section; and
   upon the number of fine grained locks exceeding a specified bound K, determining one or more alternative coarser grained locks to be used in place of the fine grained locks such that the number of locks for the atomic section do not exceed the specified bound K.

2. The method of claim 1 further comprising:
   acquiring the alternative coarser grained locks in either a pre-order or a post-order.

3. The method of claim 1 wherein the alternative coarser grained locks are acquired by a runtime library.

4. The method of claim 1 wherein the locks are determined by a compiler system.

5. The method of claim 1 wherein at least one of the one or more alternative coarser grained locks is a fictitious lock.

6. The method of claim 1 wherein the locks determined are disjoint.

7. A computer-implemented method of determining one or more locks to be acquired for a concurrent program, the method comprising:
   identifying an atomic section of the concurrent program, the atomic section including a plurality of statements that reference a plurality of variables used within the atomic section, wherein each variable refers to a memory location;
   determining expression correspondence for the atomic section by performing a backwards inter-procedural analysis on the atomic section to determine which of the memory locations need to be locked during execution of the atomic section, the backwards inter-procedural analysis comprising examining lines of code within the atomic section in a bottom to top order, the backward inter-procedural analysis including determining that a memory location is referred to by more than one of the plurality of variables, and placing a fine grained lock on only one of the more than one variables which refer to the memory location;
   after performing the backwards inter-procedural analysis, determining a number of fine grained locks which were placed on the variables of the atomic section; and
   upon the number of fine grained locks exceeding a specified bound K, determining one or more alternative coarser grained locks to be used in place of the fine grained locks such that the number of locks for the atomic section do not exceed the specified bound K.

8. The method of claim 7 wherein at least one of the one or more alternative coarser grained locks is a fictitious lock.

9. The method of claim 7 wherein the locks determined are disjoint.

10. A computer program product comprising one or more physical computer-readable media having instructions encoded thereon which, when executed, implement a method of determining locks to be acquired for an atomic section of a concurrent program, the method comprising:
    identifying an atomic section of the concurrent program, the atomic section including a plurality of statements that reference a plurality of variables used within the atomic section, wherein each variable refers to a memory location;
    performing a backwards inter-procedural analysis on the atomic section to determine which of the memory locations need to be locked during execution of the atomic section, the backwards inter-procedural analysis comprising examining lines of code within the atomic section in a bottom to top order, the backward inter-procedural analysis including determining that a memory location is referred to by more than one of the plurality of variables, and placing a fine grained lock on only one of the more than one variables which refer to the memory location;
    after performing the backwards inter-procedural analysis, determining a number of fine grained locks which were placed on the variables of the atomic section; and
    upon the number of fine grained locks exceeding a specified bound K, determining one or more alternative coarser grained locks to be used in place of the fine grained locks such that the number of locks for the atomic section do not exceed the specified bound K.

11. The method of claim 10 wherein determining alternative coarser grained locks comprises determining group level locks.

* * * * *